W. H. H. NEEDY.
BALANCE STAFF FOR TIMEPIECES.
APPLICATION FILED AUG. 11, 1921.
1,423,446.
Patented July 18, 1922.
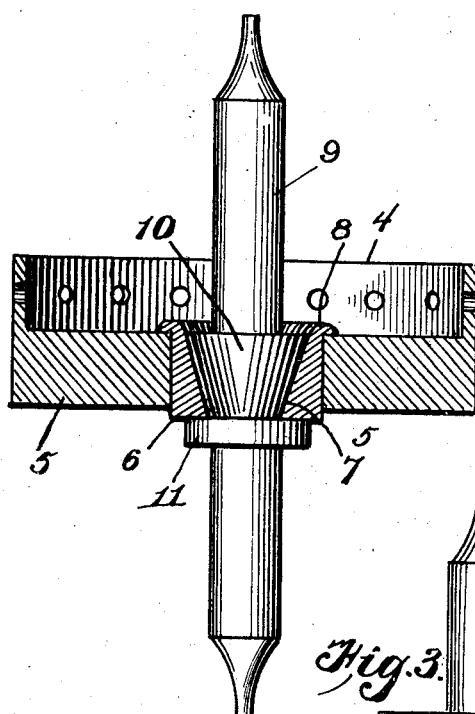
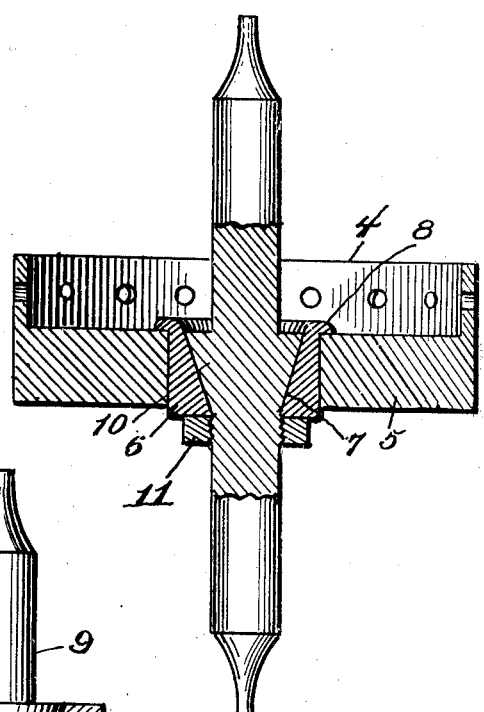
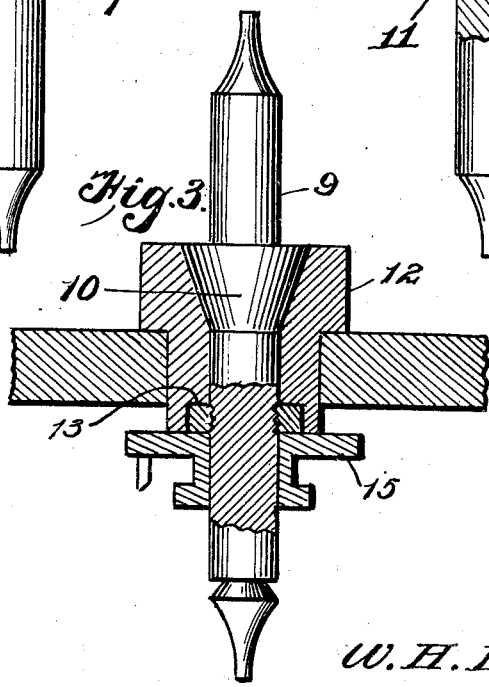
Inventor
W. H. H. Needy
By
Attorney

UNITED STATES PATENT OFFICE.

WILLIAM H. H. NEEDY, OF HAGERSTOWN, MARYLAND.

BALANCE STAFF FOR TIMEPIECES.

1,423,446.

Specification of Letters Patent.  Patented July 18, 1922.

Application filed August 11, 1921. Serial No. 491,598.

*To all whom it may concern:*

Be it known that I, WILLIAM H. H. NEEDY, a citizen of the United States, residing at Hagerstown, in the county of Washington and State of Maryland, have invented new and useful Improvements in Balance Staffs for Timepieces, of which the following is a specification.

This invention relates to the balance mechanism of time pieces, having particular reference to the balance staff for supporting the balance arm or wheel.

The primary object of the invention is to provide a balance mechanism of such construction that the wheel may be readily applied to the staff without driving or forcing as has been heretofore necessary, and wherein the balance staff and wheel may be properly assembled and maintained rigid and true with respect to each other.

A further object of the invention is to provide a balance mechanism of such construction that the wheel and staff may be readily taken apart when desired without danger of damage to either, the construction being such as to enable balance wheels and staffs to be interchangeably used.

A still further object is to provide a balance mechanism of the character stated wherein the parts are of extremely simple construction, capable of ready assemblage, which requires but a small amount of time in properly assembling the parts, which may be manufactured at reduced cost, and which will prove thoroughly practical and efficient in operation.

With these and other objects in view, the invention consists of the features of construction, combination and arrangement of parts, hereinafter fully described and claimed, reference being had to the accompanying drawing, in which:—

Figure 1 is an enlarged elevation of the improved staff, and illustrating (in section) the application thereto of a conventional type of balance wheel, Figure 2 is a similar view showing the staff in section, and Figure 3 is a view similar to Figure 2 and illustrating a slightly modified type of connection between the staff and balance arm.

Referring now more particularly to the drawing, 4 indicates a balance wheel of conventional form, and 5 the arm thereof. The center of the wheel is bored as shown, and a steel or other hard metal bushing 6 is truly centered in the wheel. In this instance, the bushing is provided with a substantially cone-shaped recess 7, and the upper part of the bushing is turned over as at 8 to form a locking means for holding one end of the bushing in the wheel. The bushing 6, as will be understood, is ground in the balance arm so as to be rigidly supported therein.

The staff for the balance mechanism is indicated at 9, and comprises the usual hard metal shaft as will be understood. This staff is provided inwardly from its ends with the cone-shaped enlargement 10 of a size substantially equal to the size of the cone recess 7 of bushing 6, the said enlargement adapted to seat snugly within said recess. The exterior surface of the staff 9 at the base of its enlargement 10 is provided with threads as shown in Figure 2, for the reception of a locking nut 11.

In assembling the device, after the bushing 6 has been rigidly affixed to the balance arm 5, the staff 9 is applied and the nut 11 engaged with the threads of the said staff. This application of the nut draws the cone surfaces of enlargement 10 and bushing 6 tightly together and maintains the balance wheel and staff rigid. It will be understood, of course, that the bushing 6 is properly centered in balance wheel 4 so that upon applying the staff and tightening the nut 11 thereon, the parts will be true with respect to each other.

In Figure 3 there is shown a slight modification, and wherein the bushing 12 is somewhat enlarged, and is provided near its lower end with an annular recess 13 to receive the locking nut 14. The roller table indicated at 15 is secured to the staff below the locking nut.

It is obvious that from the foregoing the balance wheel and staff may be rigidly and yet separably assembled without the use of the wedging or riveting operations and yet the said parts will always be maintained true and properly centered. By constructing the staff and balance wheel in this manner it is obvious that they may be interchangeably used when desired.

While the above is a description of the invention in its preferred embodiment, it is obvious that various changes in the construction and arrangement of parts may be made without departing from the spirit of the invention as defined by the appended claims.

Having thus fully described my invention, I claim:—

1. In a device of the class described, a balance arm, a bushing rigidly affixed centrally of said arm, the bushing having an angular surface in its bore, a staff, an enlargement on said staff corresponding to the shape and size of the angular portion of said bushing, the bushing having a recess in one end, threads on said staff, and a nut to engage with said threads and adapted to enter said recess and to draw the bushing and enlargement in locking engagement with each other.

2. In a device of the class described, a balance arm having a central opening therein, a bushing fitted snugly in said opening and protruding at its ends beyond the edges of said arm, the said bushing having an angularly walled bore, a staff, an enlargement integral with said staff and being shaped exteriorly to correspond to the size and shape of the bore of said bushing, threads upon said staff adjacent to one end of said enlargement, and a lock nut on said staff engaged with said threads and adapted to engage with the adjacent end of said bushing.

In testimony whereof I affix my signature.

WILLIAM H. H. NEEDY.